(12) United States Patent
Henner et al.

(10) Patent No.: US 9,970,453 B2
(45) Date of Patent: May 15, 2018

(54) PROPELLER FOR VENTILATOR, WITH A VARIABLE CHORD LENGTH

(75) Inventors: Manuel Henner, Auffargis (FR); Bruno Demory, Marines (FR); Elias Tannoury, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 1011 days.

(21) Appl. No.: 13/876,870

(22) PCT Filed: Jul. 28, 2011

(86) PCT No.: PCT/EP2011/063047
§ 371 (c)(1),
(2), (4) Date: Aug. 2, 2013

(87) PCT Pub. No.: WO2012/041565
PCT Pub. Date: Apr. 5, 2012

(65) Prior Publication Data
US 2014/0056710 A1    Feb. 27, 2014

(30) Foreign Application Priority Data

Sep. 29, 2010 (FR) ...................... 10 57868

(51) Int. Cl.
*B63H 1/16* (2006.01)
*F04D 29/32* (2006.01)
(Continued)

(52) U.S. Cl.
CPC ......... *F04D 29/326* (2013.01); *F04D 29/384* (2013.01); *B63H 1/26* (2013.01);
(Continued)

(58) Field of Classification Search
CPC .... Y10S 416/02; Y10S 416/05; F04D 29/326; F04D 29/384; F04D 29/325;
(Continued)

(56) References Cited

U.S. PATENT DOCUMENTS 632,740 A    9/1899 Parker
2003/0012656 A1*  1/2003 Cho .................. F04D 29/326
                                                          416/235

(Continued)

FOREIGN PATENT DOCUMENTS

| EP | 1577562 A2 | 9/2005 |
| WO | WO 2007/089081 A1 | 8/2007 |
| WO | WO 2012/041564 A1 | 4/2012 |

OTHER PUBLICATIONS

English language abstract for WO 2012/041564 extracted from the espacenet.com database on Jun. 21, 2013, 25 pages.
(Continued)

*Primary Examiner* — Mark Laurenzi
*Assistant Examiner* — Anthony Ayala Delgado
(74) *Attorney, Agent, or Firm* — Howard & Howard Attorneys PLLC

(57) ABSTRACT

A blower wheel comprises a hub, a guide and blades extending radially between the hub and the guide, each blade comprising a root at its junction with the hub and a head at the junction with the guide, each blade having a leading edge and a trailing edge between which, at each flattened cross section, a chord is defined. For each blade, between the root and the head, the length of the chord varies and the variation in the length of chord between the root and the head has a point of inflexion between two levels.

14 Claims, 5 Drawing Sheets

(51) Int. Cl.
*F04D 29/38* (2006.01)
*B64C 27/46* (2006.01)
*F01D 5/14* (2006.01)
*B63H 1/26* (2006.01)

(52) U.S. Cl.
CPC ............ *B64C 27/463* (2013.01); *F01D 5/141* (2013.01); *F05B 2260/96* (2013.01); *Y02T 50/673* (2013.01)

(58) Field of Classification Search
CPC .... F04D 29/164; F04D 29/284; Y02T 50/673; F01D 5/141; B63H 1/26; B64C 27/463; F05B 2260/96; F05D 2240/301
USPC ......................................................... 416/235
See application file for complete search history.

(56) References Cited

U.S. PATENT DOCUMENTS

2006/0165526 A1  7/2006  Cho et al.
2013/0323062 A1  12/2013  Henner et al.

OTHER PUBLICATIONS

International Search Report for Application No. PCT/EP2011/063045 dated Feb. 21, 2012, 5 pages.
International Search Report for Application No. PCT/EP2011/063047 dated Feb. 20, 2012, 5 pages.

* cited by examiner

PROPELLER FOR VENTILATOR, WITH A VARIABLE CHORD LENGTH

RELATED APPLICATIONS

This application is the National Stage of International Patent Application No. PCT/EP2011/063047, filed on Jul. 28, 2011, which claims priority to and all the advantages of French Patent Application No. FR 10/57868, filed on Sep. 29, 2010, the content of which is incorporated herein by reference.

The invention relates to a blower wheel comprising a hub and blades extending radially outward from the hub.

Such wheels are used notably for cooling the engine for driving motor vehicles, the wheel producing a stream of air through a heat exchanger.

The hub of the wheel, also called the "bowl", is suitable for being locked onto the shaft of a motor, which may be an electric motor driven by control electronics.

If such a wheel is used for cooling an engine of a motor vehicle, it is placed either in front of or behind the radiator used to cool the engine.

The design of these wheels poses numerous problems in practice when it is sought to improve both their aeraulic and acoustic performance.

Specifically it is necessary to take account of their aerodynamic criteria that are known through the theory of profiles (drag and lift) and by the rules of radial equilibrium because the total pressure must be balanced in the absence of loss of entropy.

In order to comply with these criteria, the blades are made, in a known manner, with a pitch angle which increases with the radius.

The pitch is defined by the angle that exists between the chord and the rotation axis, the chord being defined as the line segment connecting the leading edge and the trailing edge of the blade on the flattened cross section.

Typically known are wheels having a pitch angle of 65° at the root and increasing up to 75° at the head.

Since the blades are by nature three-dimensional, secondary flows, notably at their root and their head are generated. In these locations, the blade is connected respectively to the hub and to the rotating guide. The flow is disrupted there and aerodynamic detachments originate there.

Attempts have been made to resolve these problems with the aid of wheels having blades for which the pitch angle reduces locally close to the head. These wheels provide satisfaction at the head but without reducing the secondary flows elsewhere.

The object of the invention is to propose such a wheel of which the shape makes it possible to limit the secondary flows at the head and at the root of the blade but also generally over the whole span of the blade.

Accordingly, the invention proposes a blower wheel, notably for cooling the engine for driving a motor vehicle, comprising a hub, a guide and blades extending radially between the hub and the guide, each blade comprising a root at its junction with the hub and a head at the junction with the guide, each blade having a leading edge and a trailing edge between which, at each flattened cross section, a chord is defined. For each blade, between the root and the head, the length of the chord varies and the variation in the length of chord between the root and the head has a point of inflexion between two levels.

Thus, by varying the length of chord, the turbulence induced by the bowl and by the guide are taken into account for the secondary flows and the secondary flows are restricted at the root and at the head and over the whole span of the blade.

According to one embodiment, the variation in the chord length has three levels with a point of inflexion between two consecutive levels.

In the radial direction, the length of the chord reduces with the radius up to a first level, the length of chord increases with the radius up to a second level and the length of chord reduces again with the radius up to a third level.

Optionally, the length of chord increases sharply between the third level and the head of the blade.

According to one variant of the embodiment, in the radial direction, the length of the chord increases with the radius up to a first level, the length of chord reduces with the radius up to a second level and the length of chord increases again with the radius up to a third level.

Optionally, the length of chord reduces sharply between the third level and the head.

In combination with certain of the foregoing features, between the root and the head, the pitch angle varies and the variation in the pitch angle between the root and the head has a point of inflexion between a first level and a second level.

Optionally, in the radial direction which extends from the root to the head, the pitch angle increases sharply with the radius up to the first level and the pitch angle increases again with the radius between the first level and the second level.

At the head, the pitch angle can be made to reduce sharply between the second level and the head of the blade.

According to one variant embodiment, in the radial direction which extends from the root to the head, the pitch angle reduces sharply with the radius up to the first level and the pitch angle reduces again with the radius between the first level and the second level.

And optionally, the pitch angle increases sharply between the second level and the head of the blade.

The wheel according to the invention has the following features alone or in combination:
- at least one of the leading edge and trailing edge has a concave undulation and is extended by a convex undulation; and/or
- the convex undulation is placed between two concave undulations; and/or
- the concave undulation is placed between two convex undulations; and/or
- each blade has a face which extends between the leading edge and the trailing edge, which has a hollow and which is extended by a bump; and/or
- the bump is placed between two hollows.

The features and advantages of the invention will emerge from the following description given as a preferred, but nonlimiting, example with reference to the appended drawings in which.

Figure 1:
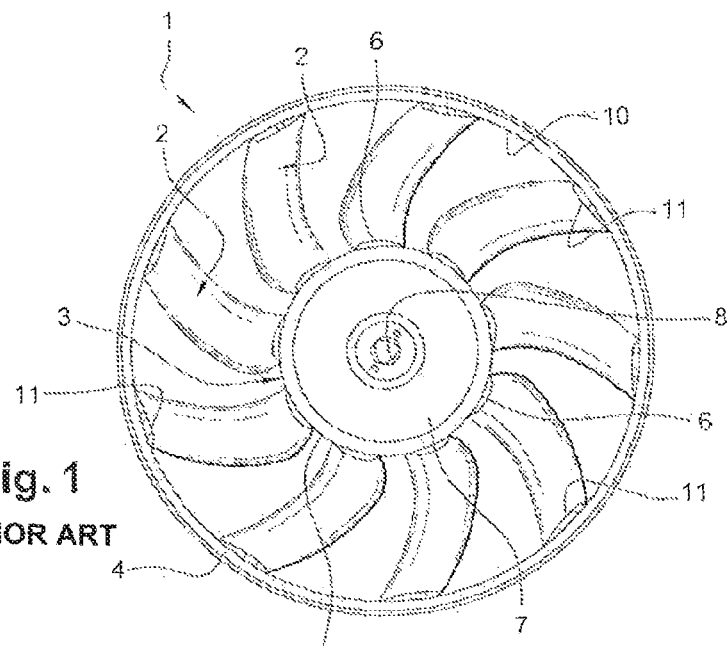
FIG. 1 is a front view of a wheel of the prior art.

The wheel 1 shown in the figures conventionally comprises a plurality of blades 2 extending generally radially from the central hub 3 and connected together, at the periphery of the wheel 1, by a guide 4. The hub 3, the blades 2 and the guide 4 are formed in one piece by molding of plastic.

The hub 3 has an axisymmetric annular wall 5, to which the roots 6 of blades 2 are connected, and a flat front wall 7, facing upstream. The terms upstream and downstream refer in this instance to the direction of the air flow produced by the rotation of the wheel 1. The front wall 7 and annular wall 5 are connected together by a rounded element with a circularly arcuate profile.

In the direction of the axis of the wheel, the front wall is connected to a central sleeve overmolded onto a metal annular insert 8 designed to connect the wheel 1 to the shaft of a drive motor not shown. Reinforcing ribs are provided inside the hub 3.

The guide 4 also has an axisymmetric annular wall 10, to which the heads 11 at the ends of the blades 2 are connected, and which is extended, from the upstream side, by a rounded flaring.

For the rest, the expression "flattened cross section 13" is defined as being the flat closed curve obtained by cutting the blade via an axisymmetric cylindrical surface about the axis of the wheel 1, and by rolling this cylindrical surface out flat. The cross section 13 of the prior art, shown in FIGS. 2 and 3, has an aerodynamically profiled shape like the profile of an aircraft wing.

Figure 3:
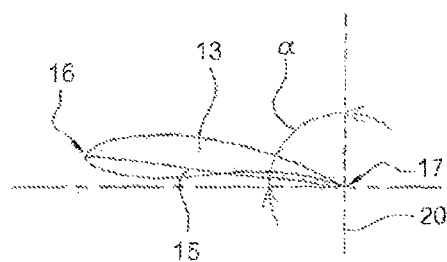
FIG. 3 is a view in section of the blade of the wheel of FIG. 2 along the flattened cross section.

The chord 15 is then defined as being the line segment connecting the leading edge 16 and the trailing edge 17 on the flattened cross section. The wheel 1 rotates in a direction defined by the "trailing edge to leading edge" direction. The pitch a, or pitch angle, is defined by the angle that exists between the chord 15 and the rotation axis 9. As can be seen in FIG. 3, the pitch angle α has been shown between the chord 15 and an axis 20 parallel to the rotation axis 9 of the wheel 1.

Figure 2:
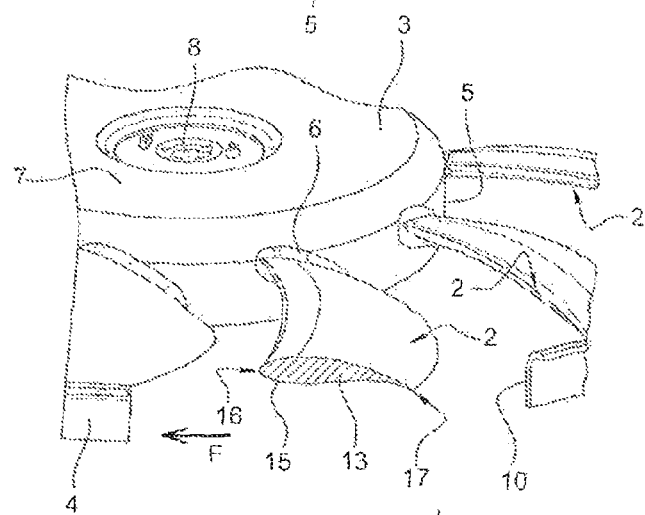
FIG. 2 is a partial view in section of the wheel of FIG. 1 with a blade cut along a cross section.

With reference to FIGS. 4 to 8, the wheel is described according to one embodiment of the invention for which the same references are retained for the wheel of the prior art shown in FIGS. 1 to 3.

The wheel 1 differs from the wheel of the prior art in the shape of the blades 2.

The blades 2 of the wheel 1 are now described. The latter comprises seven identical blades 2 which extend from the hub 3 to the guide 4 and are distributed angularly in an even manner about the hub 3.

Figure 4:
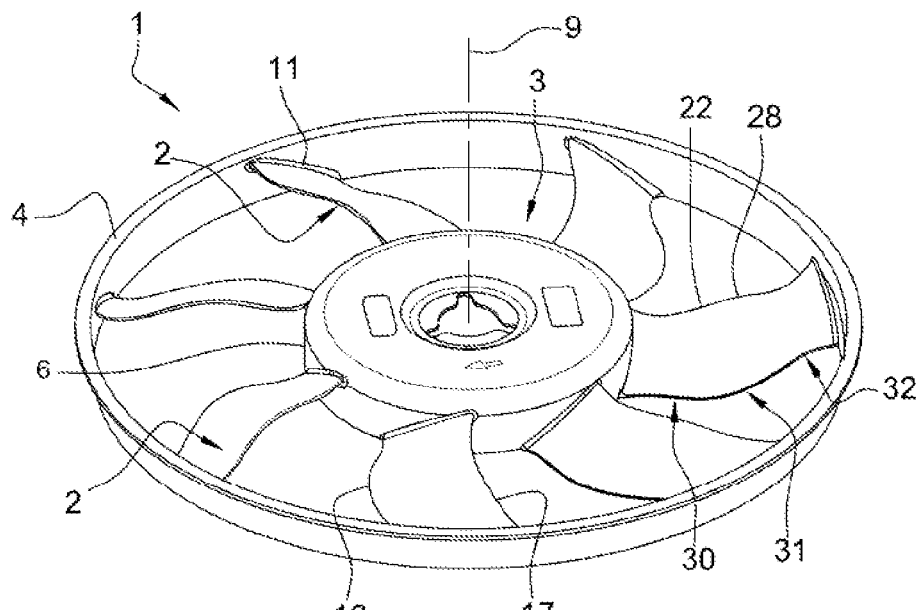
FIG. 4 is a view in perspective of the front face of a wheel according to the invention.
Figure 5:
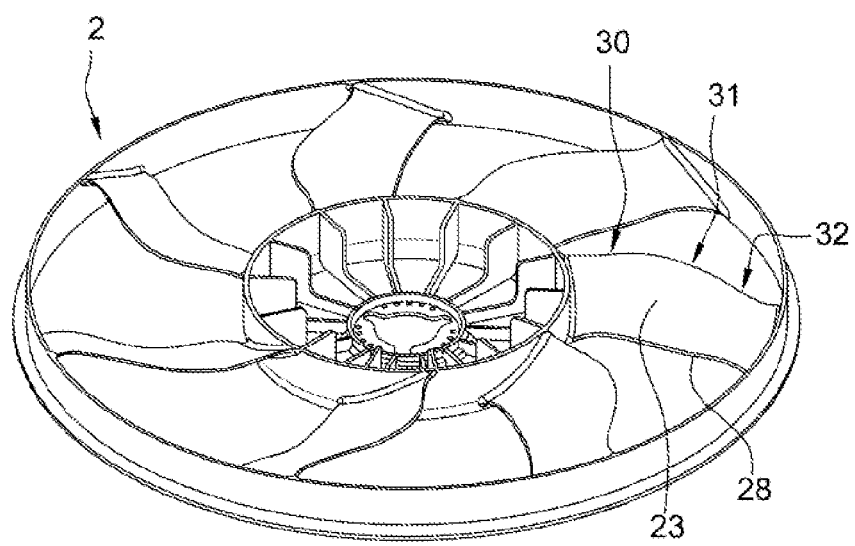
FIG. 5 is a view in perspective of the rear face of the wheel of FIG. 4.

Each blade 2 has an upstream face 22 and a downstream face 23, the upstream faces 22 being able to be seen in FIG. 4 while the downstream faces 23 can be seen in FIG. 5.

Since the blades 2 are identical to one another, only one is described with reference to FIGS. 4 to 10.

In general, the shape of the blade 2 is obtained by varying from the root 6 to the head 11 the length of chord 15 on the one hand and the pitch angle α. Variation in the length of chord 15 has an effect on the width of the blade 2. It results in the presence of undulations on, in this instance, the leading edge. The variation in the pitch a has an effect on the relief of the blade 2 by creating bumps and hollows.

The blade 2 has a leading edge 16 which undulates. Starting from the root 6, the edge 16 begins with an undulation or concave curve 25. The concave curve 25 is extended by a convex curve 26 which itself is extended by a concave curve 27. The curve 27 has its end opposite to the root 6 at the head 11 at the junction between the blade 2 and the guide 4.

Three determined points 30, 31, 32 are defined on the leading edge 16 of the blade 2. The point 30 is situated close to the root 6. The point 31 is situated in a zone at the distance of half a blade between the root 6 and the head 11. The point 32 for its part is situated close to the head 11.

The point 30 is situated on the summit of the concave curve 25; the point 31 is situated on the summit of the curve 26; the point 32 is situated on the summit of the curve 27.

The trailing edge 17 for its part has a curve having a single concavity, which is flatter, that is to say that it has a wide central level 28 that is almost flat.

Figure 10:
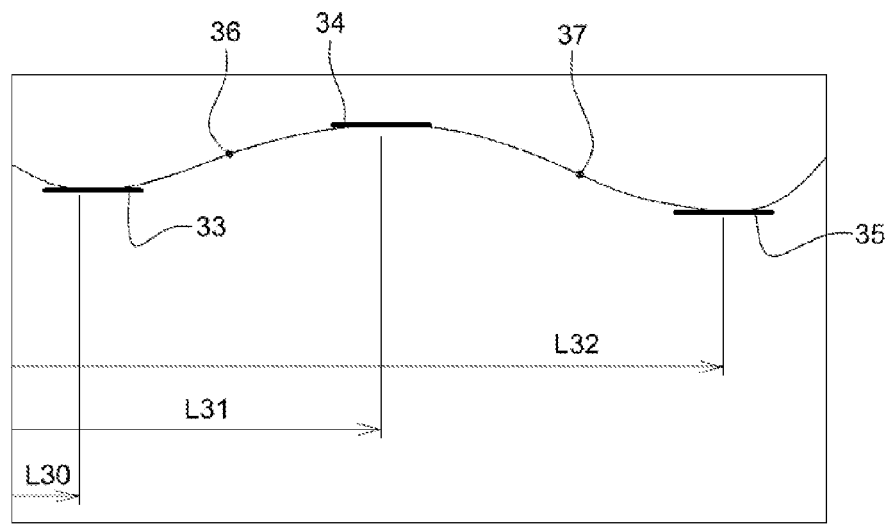

Reference is now made to FIG. 10 which shows the evolution of the length of the chord 15 relative to the span of the blade 2, that is to say relative to the distance to the root 6. This figure contains the values L30, L31 and L32 which correspond to the distance from the points 30, 31 and 32 to the root 6 of the blade 2.

The graph shows that between the root 6 and the point 30, that is to say over the length L30, the length of the chord diminishes. At this point 30, it reaches a first minimum. And around this point 30, the evolution of the length of chord occurs on a level 33 where the length of chord virtually does not evolve. Here and in the rest of the description, it is considered that the length evolves virtually not at all when, over a range of 10% of the span of the blade, the length of chord does not evolve more than 5%. According to a variant, it is possible to provide a level for which the evolution of chord is not more than 3%.

Over the length L31 deducted from the length L30 and therefore between the points 30 and 31, the length of chord increases. This length of chord reaches a maximum at the point 31. And around this point 31, the evolution of the length of chord occurs on a level 34 where the length of chord virtually does not evolve.

Between the two levels 33, 34 and hence between the minimum corresponding to the point 30 and the maximum corresponding to the point 31, the curve of evolution of the chord has a first point of inflexion 36.

Over the length L32 deducted from the length L31, that is to say between the points 31 and 32 of the blade, the length of chord reduces again to reach a second minimum. And around this point 32, the evolution of the length of chord occurs on a level 35 where the length of chord virtually does not evolve.

Between the two levels 34, 35 and hence between the maximum corresponding to the point 31 and the second minimum corresponding to the point 32, the curve of the evolution of the chord has a second point of inflexion 37.

Over the rest of the length of blade 2, that is to say between the point 32 and the head 11 of the blade 2, the length of chord increases sharply. "Sharply" means that the gradient of the increase between the point 32 and the head 11 is much greater, in absolute value, than the gradient of the reduction between the point 31 and the point 32.

These variations in the length of chord are the result of the undulations of the leading edge as described above.

According to a variant embodiment not shown, between the root 6 and the point 30, the length of the chord reduces sharply. Here also, and as in the rest of the description, sharply means that, in absolute value, the gradient is much greater on this segment than on a segment where the variation is not qualified as sharp.

Like the length of chord 15, the value of the pitch angle α varies between the root 6 and the head 11. This is the result notably of the presence of reliefs on the faces of the blade 12.

Figure 6:
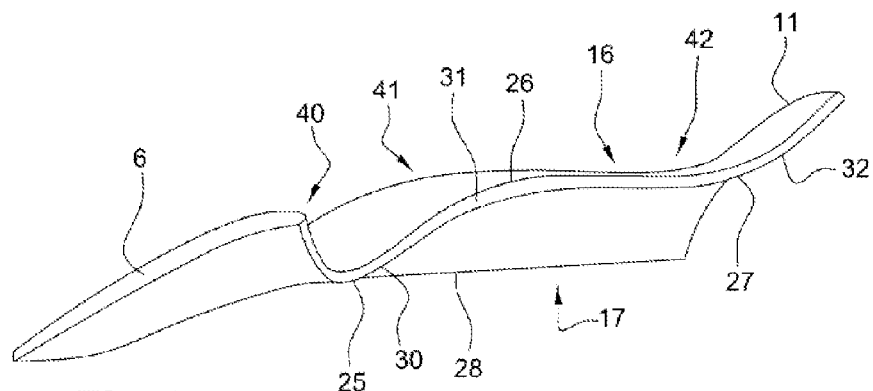
FIGS. 6, 7 and 8 are views in perspective along three different angles of a blade according to the invention.
Figure 7:
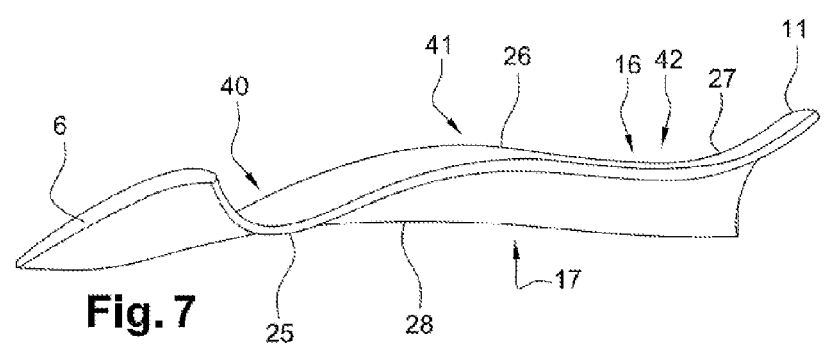
Figure 8:
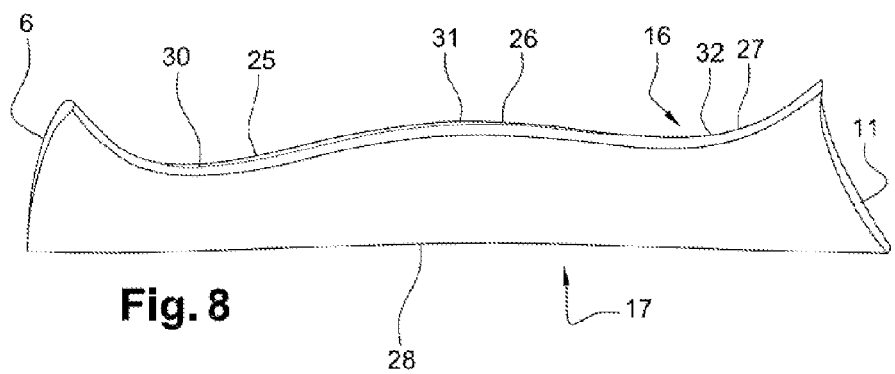

Therefore, as can be seen in FIGS. 6 to 8, the upstream face 22 of the blade 2 has, on the side of the root 6, a hollow 40. In the middle of the face 22, the latter has a bump 41. And on the side of the head 11, the surface again has a hollow 42 so that the face 22 has a bump 41 with, on either side, a hollow 40, 42. The bump 41 and the hollows 40, 42 extend approximately over the whole width of the face 22 even though the summits or minimums of these hollows or bump are not in this instance on the edges 16, 17.

The downstream face for its part has opposite reliefs.

Figure 9:
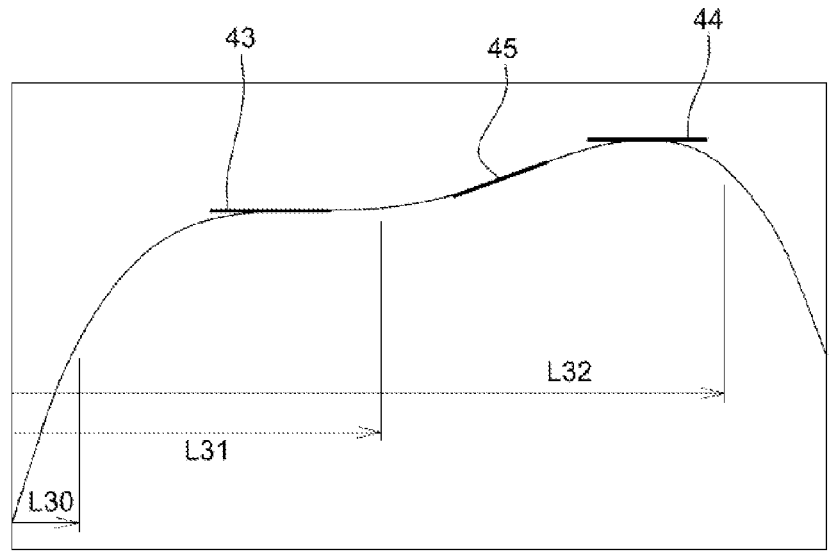
FIGS. 9 and 10 are graphs showing curves representing respectively the variation in the pitch and the variation in the length of the chord as a function of the distance to the root of the blade.

Reference is now made to FIG. 9 which shows the evolution of the pitch angle α relative to the span of the blade 12, that is to say relative to the distance to the root 6. The values L30, L31 and L32 are also shown in this figure.

The pitch a increases sharply from the root 6 over the whole length L30 and continues to increase greatly up to a level 43 which is situated between the points 30 and 31. In the zone of the level 43, the pitch a is maintained at a constant value and then increases again from the point 31. The increase continues and passes through a point of inflexion 45. After the point of inflexion 45, the pitch a again increases up to a second level 44. The second level 44 is situated between the point 31 and the point 32, slightly before the point 32. After the level 44 and more clearly after the point 32, the pitch a reduces sharply up to the head 11.

According to a variant not shown, after the level 43, the value of the pitch a reduces to a minimum in order to increase thereafter.

These variations in the pitch angle are a result of the shape of the blade 2 with its hollows and bump as described above.

According to a variant shown in FIGS. 11 and 12, described below in detail, the evolutions of length of chord and of pitch a are inverted relative to what has been described above with reference to FIGS. 9 and 10.

Figure 12:
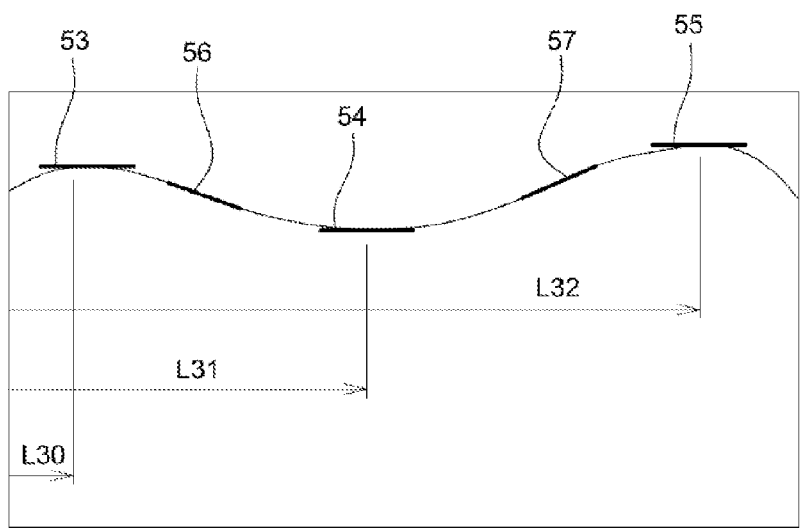

Reference is now made to FIG. 12 which shows the evolution of the length of the chord 15 relative to the span of the blade 12, that is to say relative to the distance to the root 6. This figure shows the values L30, L31 and L32 which correspond to the distance from the points 30, 31 and 32 to the root 6 of the blade 2.

The graph shows that between the root 6 and the point 30, that it is say over the length L30, the length of the chord increases. At this point 30, it reaches a first maximum. And around this point 30, the evolution of the length of chord is carried out on a level 53 where the length of chord virtually does not evolve.

Over the length L31 deducted from the length L30 and hence between the points 30 and 31, the length of chord increases. This length of chord reaches a maximum. And around this point 31, the evolution of the length of chord occurs on a level 54 where the length of chord virtually does not evolve.

Between the two levels 53, 54 and hence between the maximum corresponding to the point 30 and the minimum corresponding to the point 31, the curve of the evolution of the chord has a first point of inflexion 56.

Over the length L32 deducted from the length L31, that is to say between the points 31 and 32 of the blade, the length of chord increases again to reach a second maximum. And around this point 32, the evolution of the length of chord occurs on a level 55 where the length of chord virtually does not evolve.

Between the two levels 54, 55 and hence between the minimum corresponding to the point 31 and the second maximum corresponding to the point 32, the curve of the evolution of the chord has a second point of inflexion 57.

Over the rest of the length of blade 2, that is to say between the point 32 and the head 11 of the blade 2, the length of chord reduces sharply.

According to a variant embodiment not shown, between the root 6 and the point 30, the length of the chord increases sharply.

Although the blade 2 has not been shown according to this variant, by analogy the leading edge 16 undulates toward and at a distance from the leading edge 17. Starting from the root 6, the edge 16 begins with a convex undulation or curve. The convex curve is extended by a concave curve which itself is extended by a concave curve. The curve has its end opposite to the root 6 at the head 11 at the junction between the blade 2 and the wall 5 of the hub 3.

Like the length of chord 15, the value of the pitch angle α varies between the root 6 and the head 11. This is the result notably of the presence of relief on the faces of the blade 12.

Figure 11:
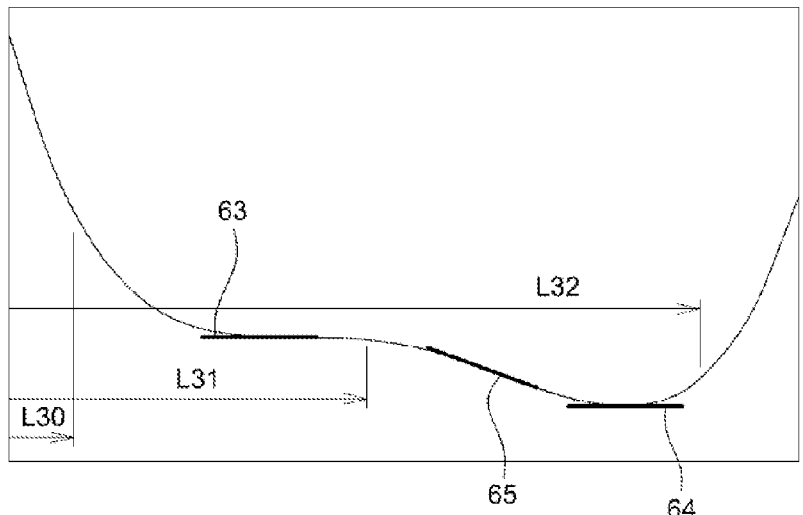
FIGS. 11 and 12 are graphs similar to those of FIGS. 8 and 9 for a blade variant.

Thus, although the blade 2 from which the graphs of FIGS. 11 and 12 have been taken has not been shown in perspective, the latter has a bump on the side of the root 6. In mid-span of the face 22, the latter has a hollow. And on the side of the head 11, the surface again has a bump so that the face 22 has a hollow with a bump on either side. The hollow and the bumps extend approximately over the whole width of the face 22. The downstream face for its part has opposite reliefs.

Reference is now made to FIG. 11 which shows the evolution of the pitch angle α relative to the span of the blade 12, that is to say relative to the distance to the root 6. The values L30, L31 and L32 are also shown in this figure.

The pitch a reduces sharply from the root 6 over the whole length L30 and continues to reduce greatly up to a level 63 which is situated between the points 30 and 31. In the zone of the level 63, the pitch a is maintained at a constant value and then reduces again from the point 31. The reduction continues and passes through a point of inflexion 65. After the point of inflexion 65, the pitch a reduces again up to a second level 64. The second level 64 is situated between the point 31 and the point 32, slightly before the point 32. After the level 64 and more clearly after the point 32, the pitch a increases sharply up to the head 11.

The blades 2 are shown with reliefs resulting from the variation in the pitch angle. While remaining within the context of the invention, it is possible to provide blades that do not have these reliefs but only the variations in the length of chord.

According to one variant embodiment, the trailing edge also has a profile with two concave curves surrounding a convex curve or vice versa depending on the profile of the leading edge. In this variant, the leading edge may or may not have an equivalent profile.

According to a variant embodiment, the evolution of the length of chord has only one point of inflexion between two levels.

According to another embodiment not shown, only certain blades are formed according to the invention while the other blades have a more conventional distribution of chord or pitch as in FIG. 1. In this case, the blades according to the invention are distributed angularly in a manner which may or may not be even.

According to an embodiment not shown, the variation in the length of chord between the root and the head has two points of inflexion of which one of the two points of inflexion is placed between a first level and a second level.

According to another embodiment not shown, only the length of chord is made to vary from the root to the head while the pitch angle α does not vary. This results in a constant orientation of the cross section and therefore an absence of reliefs (consecutive hollows and bumps).

The present invention is not limited to the embodiment described and represented but encompasses any variant embodiment.

The invention claimed is:

1. A blower wheel for cooling an engine for driving a motor vehicle, said blower wheel comprising a hub, a guide and blades extending radially between the hub and the guide, each blade comprising a root at its junction with the hub and a head at the junction with the guide, each blade having a leading edge and a trailing edge between which, at each flattened cross section, a chord is defined, wherein for each blade, in the radial direction from the root to the head, the length of the chord varies and wherein the variation in the length of the chord between the root and the head has a point of inflexion between two levels, and the variation in the length of the chord has three levels with a point of inflexion between two consecutive levels, and each level is independently a point at which the length of the chord does not vary, and in the radial direction, the length of the chord reduces with the radius up to a first level, the length of chord increases with the radius up to a second level, and the length of chord reduces again with the radius up to a third level, and wherein the first level, the second level, and the third level are on different radial planes from one another, and wherein the leading edge and the trailing edge of a single blade have non-equivalent profiles such that the leading edge comprises a plurality of undulations and the trailing edge comprises a curve having a single concavity.

2. The wheel as claimed in claim 1, wherein in the radial direction, the length of chord increases sharply between the third level and the head of the blade.

3. The wheel as claimed in claim 1, wherein in the radial direction, the length of the chord increases with the radius up to a first level, the length of chord reduces with the radius up to a second level and the length of chord increases again with the radius up to a third level.

4. The wheel as claimed in claim 1, wherein the length of chord reduces sharply between the third level and the head.

5. The wheel as claimed in claim 1, wherein between the root and the head, the pitch angle varies and in that the variation in the pitch angle between the root and the head has a point of inflexion between a first level and a second level.

6. The wheel as claimed in claim 5, wherein in the radial direction, the pitch angle increases sharply with the radius up to the first level and the pitch angle increases again with the radius between the first level and the second level.

7. The wheel as claimed in claim 5, wherein at the head, the pitch angle reduces sharply between the second level and the head.

8. The wheel as claimed in claim 5, wherein in the radial direction, to the head, the pitch angle reduces sharply with the radius up to the first level and the pitch angle reduces again with the radius between the first level and the second level.

9. The wheel as claimed in claim 5, wherein the pitch angle increases sharply between the second level and the head.

10. The wheel as claimed in claim 1, wherein at least one of the leading edge and trailing edge has a concave undulation and is extended by a convex undulation.

11. The wheel as claimed in claim 10, wherein the convex undulation is located between two concave undulations.

12. The wheel as claimed in claim 10, wherein the concave undulation is located between two convex undulations.

13. The wheel as claimed in claim 1, wherein each blade has a face which extends between the leading edge and the trailing edge, which has a hollow and which is extended by a bump.

14. The wheel as claimed in claim 13, wherein the bump is located between two hollows.

* * * * *